(12) United States Patent
Brady et al.

(10) Patent No.: US 11,373,255 B2
(45) Date of Patent: Jun. 28, 2022

(54) COMPUTER SYSTEM AND METHOD FOR MIRRORING DATA ACROSS DIFFERENT ACCOUNTS OF A SOFTWARE AS A SERVICE (SAAS) APPLICATION

(71) Applicant: Procore Technologies, Inc., Carpinteria, CA (US)

(72) Inventors: Collin Brady, Santa Barbara, CA (US); Jon Hoover, Camarillo, CA (US); Terrence Cole, Santa Barbara, CA (US)

(73) Assignee: Procore Technologies, Inc., Carpinteria, CA (US)

( * ) Notice: Subject to any disclaimer, the term of this patent is extended or adjusted under 35 U.S.C. 154(b) by 252 days.

(21) Appl. No.: 16/580,775

(22) Filed: Sep. 24, 2019

(65) Prior Publication Data

US 2021/0090186 A1   Mar. 25, 2021

(51) Int. Cl.
*G06Q 50/08* (2012.01)
*G06F 16/178* (2019.01)
*G06F 16/23* (2019.01)
*G06Q 10/10* (2012.01)

(52) U.S. Cl.
CPC .......... *G06Q 50/08* (2013.01); *G06F 16/178* (2019.01); *G06F 16/23* (2019.01); *G06Q 10/103* (2013.01)

(58) Field of Classification Search
CPC .. G06Q 10/103; G06Q 10/101; G06F 16/178; G06F 16/27
See application file for complete search history.

(56) References Cited

U.S. PATENT DOCUMENTS 7,925,749 B1  4/2011  Lin et al.
10,698,957 B1*  6/2020  Sacks ..................... G06F 16/93
(Continued)

FOREIGN PATENT DOCUMENTS

KR   10-2016-0014518 A   2/2016

OTHER PUBLICATIONS

International Searching Authority Written Opinion dated Dec. 4, 2024, issued in connection with International Application No. PCT/US2020/050372, filed Sep. 11, 2020, 10pages.
(Continued)

*Primary Examiner* — Robert W Beausoliel, Jr.
*Assistant Examiner* — Pedro J Santos
(74) *Attorney, Agent, or Firm* — Lee Sullivan Shea & Smith LLP

(57) ABSTRACT

Disclosed herein is software technology that enables different accounts to be mirrored. In one aspect, the disclosed process may involve determining that an origin data record created under a first account of a first party is to be mirrored to a second account of a second party, generating a thread identification that is mapped to the data record created under the first account of the first party, and generating a first message that comprises data from the origin data record and the thread identifier that is mapped to the origin data record. Based on the first message, the disclosed process may further involve creating a target data record under a second account of a second party that corresponds to the origin data record created under the first account of the first party and storing the target data record under the second account of the second party.

20 Claims, 9 Drawing Sheets

(56) References Cited

U.S. PATENT DOCUMENTS

| | | | |
|---|---|---|---|
| 2002/0091835 A1* | 7/2002 | Lentini | G06F 16/958 709/227 |
| 2005/0125277 A1* | 6/2005 | Estrada | G06Q 10/10 705/301 |
| 2005/0182641 A1* | 8/2005 | Ing | G06Q 10/06 705/7.27 |
| 2007/0130214 A1 | 6/2007 | Boyd et al. | |
| 2014/0082085 A1 | 3/2014 | Krishnaprasad et al. | |
| 2016/0026496 A1 | 1/2016 | Larimore et al. | |
| 2016/0182412 A1* | 6/2016 | Kabbes | H04L 29/08072 709/206 |

OTHER PUBLICATIONS

Procore. Create an RFI. Jun. 27, 2019. [online], [retrieved on Oct. 9, 2019], Retrieved from the Internet: <https://support.procore.com/products/online/user-guide/project-level/rfi/tutorials/create-an-rfi>.

Procore. How do I invite users and collaborators to my company's Procore account?. Aug. 16, 2019. [online], [retrieved on Oct. 9, 2019]. Retrieved from the Internet: <https://support.procore.com/faq/how-do-i-invite-users-and-collaborators-to-my-companys-procore-account>.

Abioye, Sofiat O. et al., "Artificial Intelligence in the Construction Industry: A Review of Present Status, Opportunities and Future Challenges", Journal of Building Engineering, vol. 44, Oct. 5, 2021, 13 pages.

* cited by examiner

300

```
┌─────────────────────────────────────────────────────────────┐
│ CAUSE A FIRST CLIENT STATION ASSOCIATED WITH A FIRST PARTY  │
│ HAVING A FIRST ACCOUNT TO PRESENT A FIRST VIEW OF A         │
│ CONNECTIONS TOOL OF A SAAS APPLICATION THAT FACILITATES     │
│ ESTABLISHING A CONNECTION BETWEEN THE FIRST PARTY AND A     │
│ SECOND PARTY HAVING A SECOND ACCOUNT                        │
│                           302                               │
└─────────────────────────────────────────────────────────────┘
                              ↓
┌─────────────────────────────────────────────────────────────┐
│ RECEIVE, FROM THE FIRST CLIENT STATION ASSOCIATED WITH THE FIRST │
│ PARTY HAVING THE FIRST ACCOUNT, A REQUEST TO ADD A CONNECTION    │
│ WITH THE SECOND PARTY HAVING THE SECOND ACCOUNT             │
│                           304                               │
└─────────────────────────────────────────────────────────────┘
                              ↓
┌─────────────────────────────────────────────────────────────┐
│ CAUSE A SECOND CLIENT STATION ASSOCIATED WITH THE SECOND    │
│ PARTY TO PRESENT A SECOND VIEW OF THE CONNECTIONS TOOL      │
│                           306                               │
└─────────────────────────────────────────────────────────────┘
                              ↓
┌─────────────────────────────────────────────────────────────┐
│ RECEIVE, FROM THE SECOND CLIENT STATION ASSOCIATED WITH THE │
│ SECOND PARTY, A REQEST TO APPROVE A PENDING CONNECTION      │
│ BETWEEN THE FIRST PARTY AND THE SECOND PARTY                │
│                           308                               │
└─────────────────────────────────────────────────────────────┘
                              ↓
┌─────────────────────────────────────────────────────────────┐
│ ESTABLISH THE CONNECTION BETWEEN THE FIRST ACCOUNT AND THE  │
│ SECOND ACCOUNT                                              │
│                           310                               │
└─────────────────────────────────────────────────────────────┘
```

FIG. 3

COMPUTER SYSTEM AND METHOD FOR MIRRORING DATA ACROSS DIFFERENT ACCOUNTS OF A SOFTWARE AS A SERVICE (SAAS) APPLICATION

BACKGROUND

Managing a construction project to completion can be a complex endeavor. Indeed, a highly-involved construction project may require significant collaboration and coordination between different parties. For instance, an owner may be responsible for funding a given construction project for a building and collaborating with an architect on its design. The architect may then collaborate with a general contractor on the construction of the building. In turn, the general contractor may hire one or more subcontractors to collaborate and coordinate on various aspects of the building, which may require the general contractor and the one or more subcontractors to exchange various information (e.g., drawings, design requirements, building codes, regulations, action items, etc.).

The collaboration that takes place between different parties involved in a construction project may take various forms. As one possibility, a given subcontractor may require specific information in order to complete a task for a construction project, and one way the given subcontractor may acquire such information is to use what is commonly referred to as a Request for Information ("RFI"). For instance, a given subcontractor working on a task for the construction project may identify an issue that requires an answer from either the general contractor and/or the architect (e.g., a construction drawing may be unclear and/or inaccurate). In such an instance, the given subcontractor may create an RFI and send it to the general contractor, who may then either answer the RFI or relay to the architect for an answer. Once the RFI is answered, the general contractor may provide the answer to the given subcontractor. There are various other ways in which parties may collaborate on a construction project as well.

Unfortunately, the collaboration that takes place between different parties involved in a construction project can be inefficient and cumbersome. For instance, an RFI created by a given subcontractor may not be answered quickly, as it often takes time for a general contractor to review and prioritize various RFIs created by other parties (e.g., other subcontractors). Further, an RFI created by a given subcontractor may not be answered concisely which may lead to miscommunication, delays in completing a given task, and/or rework to complete a given task with the correct information. Other types of projects and collaboration that takes place in a respective type of project may suffer from similar issues.

Overview

In view of the foregoing, software applications have been developed to assist with the task of managing a construction project. For instance, Procore Technologies, Inc. has developed a construction management software application that includes various software tools to help facilitate collaboration between different parties involved in a construction project (e.g., general contractors, subcontractors, architects, owners, etc.). Some examples of these software tools may include an "RFI" tool that enables parties to create and manage RFIs for a construction project, a "Budget" tool that enables parties to build and manage a budget for a construction project, a "Documents" tool that enables parties to manage and save project documentation (e.g., drawings, specifications, emails, etc.), and a "Schedule" tool that enables parties to manage a project's schedule, among other example tools.

In practice, a construction management software application may be provided to a user in the form of a software as a service ("SaaS"), in which case the software application may include a front-end software component running on a user's client station and a back-end software component running on a back-end platform that is accessible to the user's client station via a communication network such as the Internet. Further, in practice, the back-end platform associated with a construction management SaaS application may be capable of serving multiple different parties that have signed up for access to the construction management SaaS application, where each such party has its own respective account for the construction management SaaS application. In this respect, the back-end platform may be configured to create and store data records for multiple different parties that interact with the construction management SaaS application, where each respective party's data records are only stored under the party's respective account and cannot be accessed by any other party that is using the construction management SaaS application. Such an architecture may at times be referred to as "multi-tenant architecture" (where each separate account holder is referred to as a separate "tenant").

There are various benefits to employing multi-tenant architecture when providing a SaaS application to multiple different parties, including but not limited to lower costs, more efficient resource utilization, improved onboarding of new customers, and ease of maintenance. However, complications arise when a construction management SaaS application includes software tools that are designed to facilitate collaboration between multiple different parties involved in a construction project that would otherwise have their own separate accounts for the construction management SaaS application, as such collaboration is in conflict with the general principle that accounts in a multi-tenant architecture are to be isolated from one another.

To illustrate with an example, when a subcontractor uses an "RFI" tool of a construction management SaaS application to create an RFI for a construction project, a typical back-end platform in a multi-tenant architecture may create an "RFI" data record that defines the RFI for the construction project and then store that RFI data record under the subcontractor's account, such that only the subcontractor can later access that RFI data record. However, this approach is in conflict with the need for the subcontractor to collaborate with another party such as a general contractor in connection with the RFI.

One way to address these complications is by allowing a first collaborating party (e.g., a general contractor) to allow individuals from a second collaborating party (e.g., a subcontractor) to access the first collaborating party's account for certain purposes, such as to collaborate on a given construction project. In this respect, the individuals from the second collaborating party may be considered as "external collaborators" under the first collaborating party's account, and any data records created as a result of such external collaborators' interaction with the construction management SaaS application may be stored under the first collaborating party's account.

To illustrate with an example, in the context of collaboration between a general contractor and a given subcontractor via an "RFI" tool of a construction management SaaS application, the general contractor may add an individual from the given subcontractor as an external collaborator on a given construction project, such that the given subcontractor may then exist as one of the authorized users of the general contractor's account. Thereafter, the general contractor (i.e., the account holder) and the given subcontractor may collaborate with one another using the tools described above, and the back-end platform may store data records related to that collaboration under the general contractor's account.

However, while the foregoing approach allows different parties to make use of collaboration tools provided by a construction management SaaS application, it still stores all data records related to the collaboration under a single account—which is the account of the first collaborating party (e.g., the general contractor) in the above example. This gives rise to several problems.

First, if the first collaborating party later updates its account to remove the external collaborators from the second collaborating party (e.g., the given subcontractor in the above example), then the second collaborating party may no longer have access to the data records stored in connection with the collaboration between the first and second collaborating parties (e.g., RFI data records), which is problematic because the second collaborating party may wish to make use of those data records in the future for its own business (e.g., to inform the party's actions in connection with a future construction project that does not involve the first collaborating party).

Second, because data records related to collaboration between the first and second collaborating parties are stored under the first collaborating party's account, the second collaborating party may be unable to record any confidential information related to a project task that the second collaborating party may not want to share with the first collaborating party.

Accordingly, there remains a need for technology that enables different parties to both collaborate with another via a construction management SaaS application and also to share certain data records stored in connection with the collaboration.

To help address these and other problems, disclosed herein is software technology that enables different accounts to be "mirrored" such that certain specified data records can be copied across accounts and thus shared. For instance, the disclosed software technology may involve a "Connections" tool that allows parties having separate accounts for a construction management SaaS application to "connect" their respective accounts such that certain data records can be mirrored across the connected accounts. For example, the Connections tool may allow a first party having a first account for a construction management SaaS application to "connect" with a second party having a second account for the construction management SaaS application, which may then enable certain data records to be mirrored across the connected first and second accounts.

At a high level, a separate instance of the mirrored data record may exist in each of the connected parties' accounts, and the separate instance of the mirrored data record in each of the connected parties' accounts may be associated with one another such that updates to an instance of the mirrored data record in a first party's account are propagated to the instance of the mirrored data record in a second party's account. If the first party later chooses to "disconnect" its account from the second party's account, the second party may still have access to the previously-mirrored data records as they existed up until the time of the disconnection.

In accordance with the present disclosure, the software technology disclosed herein may involve two primary phases: (1) a first phase that involves establishing a connection between a first party having a first account for a construction management SaaS application and a second party having a second account for the construction management SaaS application via the Connections tool, and (2) a second phase that involves mirroring data records across the connected accounts. Each of these phases—which may take various forms and be carried out in various manners—are described in further detail below.

In one implementation, the first phase of the disclosed process may involve a back-end platform (1) causing a first client station associated with a first party having a first account to present a first view of the Connections tool of the disclosed construction management SaaS application, (2) receiving, from the first client station associated with the first party having the first account, a request to add a connection with a second party having a second account, (3) causing a second client station associated with the second party to present a second view of the Connections tool, (4) receiving, from the second client station associated with the second party, a request to approve a pending connection between the first party and the second party, and (5) establishing a connection between the first account and the second account, which may involve storing data defining the relationship between the two connected accounts as "connection data" in a given data store.

Once back-end platform 102 establishes a connection between a first account of a first party and a second account of a second party, the disclosed process may transition from the first phase to the second phase, which generally involves mirroring data records across the connected accounts (e.g., the first party's account and the second party's account). The second phase of the disclosed process may take various forms and the functions carried out in the second phase may be carried out in various manners.

In one implementation, in order to facilitate the mirroring of data records across connected accounts, the back-end platform may comprise a first software routine associated with the "originator" of a data record and a second software routine associated with the "target" of the data record. In this context, a first party who creates a data record under the first party's account that is to be mirrored across a second party's account may be referred to herein as the "originator" of the data record, and the second party who receives the mirrored data record may be referred to herein as the "target" of the data record. The first software routine associated with the "originator" of a data record and the second software routine associated with the "target" of the data record may take various forms and may carry out various functions in various manners.

As one example, the first software routine may function to (1) determine whether a data record created under a first party's account is to be mirrored with a second party's account, where the first party may be the originator of the data record and the second party may be a respective target of the data record, (2) after determining that the created data record is to be mirrored with the connected account (e.g., the second party's account), generate a thread identifier (which may be referred to herein as a "thread ID") that is mapped to the created data record, (3) generate a message that comprises at least a portion of the data from the created data record and the thread ID (and perhaps various other information described in more detail below), (4) optionally generate an alert to the connected account (the second party's account), and (5) provide the generated message to the second software routine to facilitate creating and storing a mirrored data record under the target's account (the second party's account). Each of these functions, which may take various forms and may be carried out in various manners, are described in more detail below.

In turn, the second software routine may function to (1) receive the generated message regarding the created data record under the first party's account (2) create a data record under the target's account (the second party's account) that corresponds to the data record created under the originator's account (the first party's account), and (3) maintain a mapping between the thread ID included in the received message and the data record created under the target's account (the second party's account) and store the created data record under the target's account.

Thereafter, the first software routine and the second software routine may use the thread ID mapped to the respective data records to propagate any updates to the respective data records either made under the originator's account or the respective target's account. The functions performed by the first software routine and the second software routine to propagate an update to a data record either made under the originator's account or a respective target's account may take various forms and may be performed in various manners described in more detail below.

Accordingly, in one aspect, disclosed herein is a method that involves (1) determining that an origin data record created under a first account of a first party is to be mirrored to a second account of a second party that has an established connection with the first account of the first party, (2) generating a thread identification that is mapped to the data record created under the first account of the first party, (3) generating a first message that comprises (a) data from the origin data record created under the first account of the first party and (b) the thread identifier that is mapped to the origin data record created under the first account of the first party, (4) based on the first message, creating a target data record under the second account of the second party that corresponds to the origin data record created under the first account of the first party, and (5) storing the target data record under the second account of the second party.

In another aspect, disclosed herein is a computing system that includes a network interface, at least one processor, a non-transitory computer-readable medium, and program instructions stored on the non-transitory computer-readable medium that are executable by the at least one processor to cause the computing system to carry out the functions disclosed herein, including but not limited to the functions of the foregoing method.

In yet another aspect, disclosed herein is a non-transitory computer-readable storage medium provisioned with software that is executable to cause a computing system to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 3 depicts an example flow chart of the first phase of the disclosed process.

DETAILED DESCRIPTION

The following disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners, each of which is contemplated herein.

I. EXAMPLE SYSTEM CONFIGURATION

The present disclosure generally involves a software application for assisting with construction management, which may take the form of a software as a service ("SaaS") application that comprises a front-end software component running on a party's client station and a back-end software component running on a back-end platform that is accessible to the party's client station via a communication network such as the Internet. As discussed above, such a construction management SaaS application may include various software tools to help facilitate collaboration between different parties involved in a construction project (e.g., general contractors, subcontractors, architects, owners, etc.). Some examples of these software tools may include an RFI tool, a Budget tool, a Documents tool, and a Schedule tool noted above, among other example tools.

Figure 1:
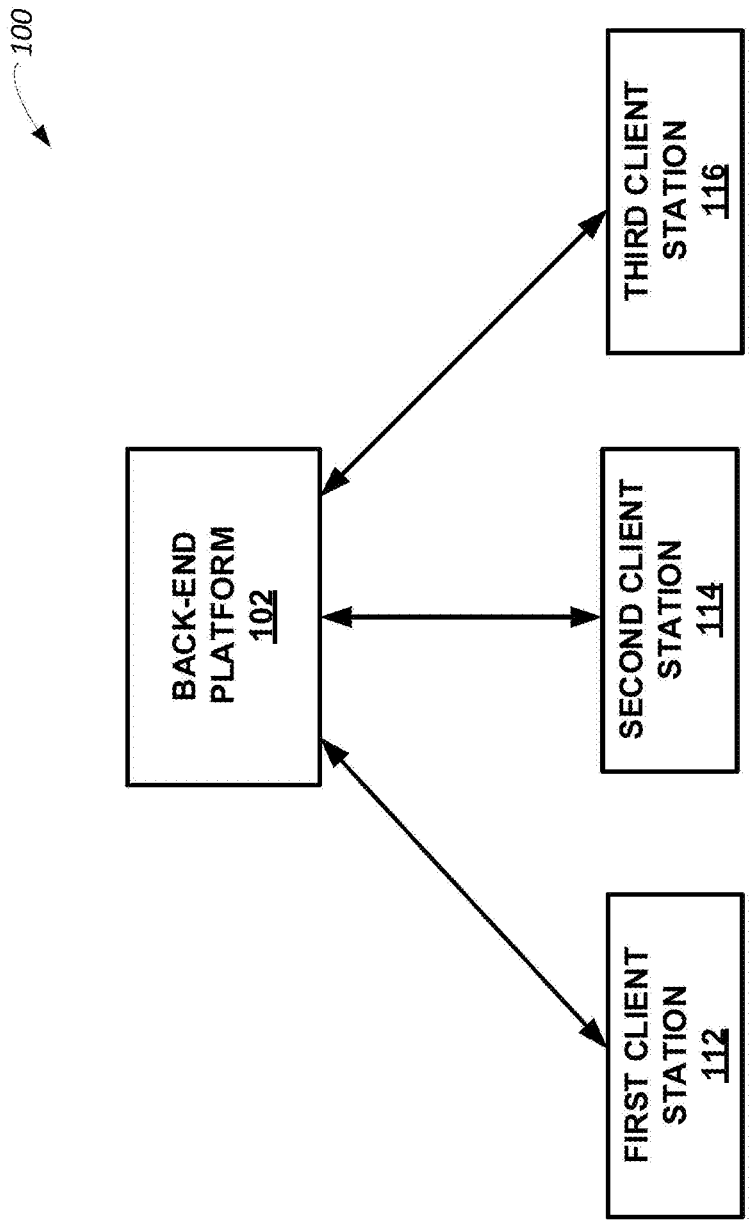
FIG. 1 depicts an example network configuration in which example embodiments may be implemented.

Turning now to the figures, FIG. 1 depicts an example network configuration 100 in which example embodiments of the present disclosure may be implemented. As shown in FIG. 1, network configuration 100 includes a back-end platform 102 that may be communicatively coupled to one or more client stations, depicted here, for the sake of discussion, as three client stations 112, 114, and 116.

In general, back-end platform 102 may comprise one or more computing systems that have been provisioned with software for carrying out one or more of the platform functions disclosed herein for driving a construction management SaaS application, including but not limited to functions related to establishing a connection between different accounts for a construction management SaaS application and/or enabling data records to be mirrored across connected accounts. The one or more computing systems of back-end platform 102 may take various forms and be arranged in various manners.

For instance, as one possibility, back-end platform 102 may comprise computing infrastructure of a public, private, and/or hybrid cloud (e.g., computing and/or storage clusters) that has been provisioned with software for carrying out one or more of the platform functions disclosed herein. In this respect, the entity that owns and operates back-end platform 102 may either supply its own cloud infrastructure or may obtain the cloud infrastructure from a third-party provider of "on demand" computing resources, such include Amazon Web Services (AWS) or the like. As another possibility, back-end platform 102 may comprise one or more dedicated servers that have been provisioned with software for carrying out one or more of the platform functions disclosed herein.

In practice, back-end platform 102 may be capable of serving multiple different parties that have signed up for access to the disclosed SaaS application, where each such party has its own respective account for the disclosed SaaS application. In this respect, back-end platform 102 may be configured to create and store data records for multiple different parties that interact with the disclosed SaaS application, where each respective party's data records are only stored under the party's respective account and cannot be accessed by any other party that is using the disclosed SaaS application. As noted above, such an architecture may at times be referred to as "multi-tenant architecture" (where each separate account holder is referred to as a separate tenant).

In accordance with its multi-tenant architecture, back-end platform 102 may be configured to store data records for different parties in various manners. As one possibility, for each party using the disclosed SaaS application, back-end platform 102 may store data records for the party in a respective datastore, such that each party using the disclosed SaaS application may have access to their own respective datastore. As another possibility, back-end platform 102 may store data records for different parties in a single datastore that is configured to isolate one party's data records from another party's data records, such that each respective party's data records are only stored under the party's respective account and cannot be accessed by any other party. Back-end platform 102 may be configured to store data records for different parties in various other manners as well.

Further, other implementations of back-end platform 102 are possible as well.

In turn, client stations 112, 114, 116 may take any of various forms, examples of which may include a desktop computer, a laptop, a netbook, a tablet, a smartphone, and/or a personal digital assistant (PDA), among other possibilities.

As further depicted in FIG. 1, back-end platform 102 is configured to interact with one or more client stations 112, 114, 116 over respective communication paths. Each communication path between back-end platform 102 and one of client stations 112, 114, 116 may generally comprise one or more communication networks and/or communications links, which may take any of various forms. For instance, each respective communication path with back-end platform 102 may include any one or more of point-to-point links, Personal Area Networks (PANs), Local-Area Networks (LANs), Wide-Area Networks (WANs) such as the Internet or cellular networks, cloud networks, and/or operational technology (OT) networks, among other possibilities. Further, the communication networks and/or links that make up each respective communication path with back-end platform 102 may be wireless, wired, or some combination thereof, and may carry data according to any of various different communication protocols. Although not shown, the respective communication paths with back-end platform 102 may also include one or more intermediate systems. For example, it is possible that back-end platform 102 may communicate with a given client station 112, 114, 116 via one or more intermediary systems, such as a host server (not shown). Many other configurations are also possible.

Although not shown in FIG. 1, back-end platform 102 may also be configured to receive data from one or more external data sources that may be used to facilitate functions related to the disclosed process. A given external data source—and the data output by such data sources—may take various forms.

It should be understood that network configuration 100 is one example of a network configuration in which embodiments described herein may be implemented. Numerous other arrangements are possible and contemplated herein. For instance, other network configurations may include additional components not pictured and/or more or less of the pictured components.

II. EXAMPLE PLATFORM

Figure 2:
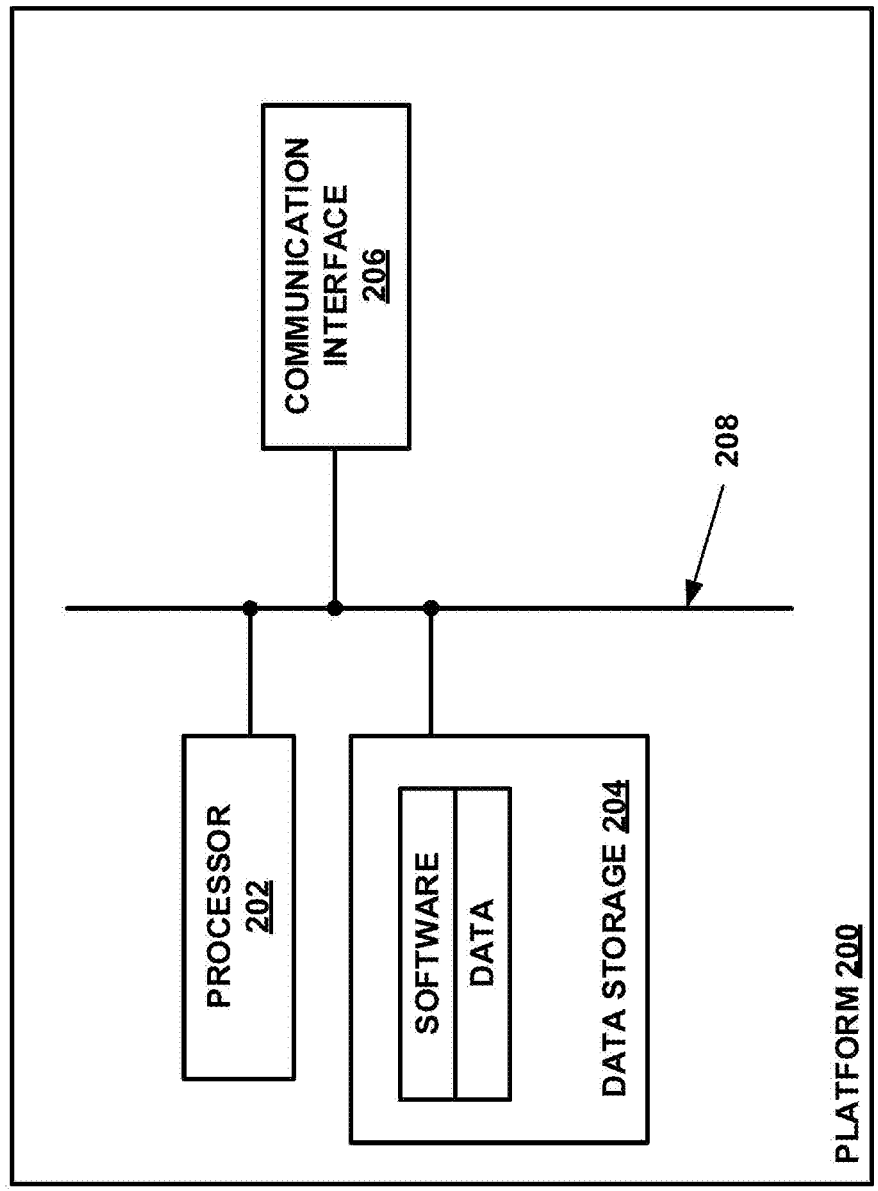
FIG. 2 depicts an example computing platform that may be configured to carry out one or more of the functions of the present disclosure.

FIG. 2 is a simplified block diagram illustrating some structural components that may be included in an example computing platform 200, which could serve as back-end platform 102 of FIG. 1. In line with the discussion above, platform 200 may generally comprise one or more computer systems (e.g., one or more servers), and these one or more computer systems may collectively include at least a processor 202, data storage 204, and a communication interface 206, all of which may be communicatively linked by a communication link 208 that may take the form of a system bus, a communication network such as a public, private, or hybrid cloud, or some other connection mechanism.

Processor 202 may comprise one or more processor components, such as general-purpose processors (e.g., a single- or multi-core microprocessor), special-purpose processors (e.g., an application-specific integrated circuit or digital-signal processor), programmable logic devices (e.g., a field programmable gate array), controllers (e.g., microcontrollers), and/or any other processor components now known or later developed. In line with the discussion above, it should also be understood that processor 202 could comprise processing components that are distributed across a plurality of physical computing devices connected via a network, such as a computing cluster of a public, private, or hybrid cloud.

In turn, data storage 204 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 204 may comprise computer-readable storage mediums that are distributed across a plurality of physical computing devices connected via a network, such as a storage cluster of a public, private, or hybrid cloud.

As shown in FIG. 2, data storage 204 may be provisioned with software components that enable the platform 200 to carry out the platform-side functions disclosed herein. These software components may generally take the form of program instructions that are executable by the processor 202 to carry out the disclosed functions, which may be arranged together into software applications, virtual machines, software development kits, toolsets, or the like. Further, data storage 204 may be arranged to store data in one or more databases, file systems, or the like. Data storage 204 may take other forms and/or store data in other manners as well.

Communication interface 206 may be configured to facilitate wireless and/or wired communication with external data sources and/or client stations, such as client stations 112, 114, 116 in FIG. 1. Additionally, in an implementation where platform 200 comprises a plurality of physical computing devices connected via a network, communication interface 206 may be configured to facilitate wireless and/or wired communication between these physical computing devices (e.g., between computing and storage clusters in a cloud network). As such, communication interface 206 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for wireless and/or wired communication. Communication interface 206 may also include multiple communication interfaces of different types. Other configurations are possible as well.

Although not shown, platform 200 may additionally include one or more interfaces that provide connectivity with external user-interface equipment (sometimes referred to as "peripherals"), such as a keyboard, a mouse or trackpad, a display screen, a touch-sensitive interface, a stylus, a virtual-reality headset, speakers, etc., which may allow for direct user interaction with platform 200.

It should be understood that platform 200 is one example of a computing platform that may be used with the embodiments described herein. Numerous other arrangements are possible and contemplated herein. For instance, other computing platforms may include additional components not pictured and/or more or less of the pictured components.

III. EXAMPLE OPERATIONS

As described above, the present disclosure is generally directed to software technology that enables certain data records across different accounts to be mirrored. For instance, the disclosed software technology may involve a "Connections" tool that allows parties having separate accounts for the disclosed construction management SaaS application to "connect" their respective accounts such that certain data records can be mirrored across the connected accounts. For example, the Connections tool may allow a first party having a first account for the disclosed SaaS application to "connect" with a second party having a second account for the disclosed SaaS application, which may then enable data records to be mirrored across the connected first and second accounts.

At a high level, a separate instance of the mirrored data record may exist in each of the connected parties' accounts, and the separate instance of the mirrored data record in each of the connected parties' accounts may be associated with one another such that updates to an instance of the mirrored data record in a first party's account are propagated to the instance of the mirrored data record in a second party's account. If the first party later chooses to "disconnect" its account from the second party's account, the second party may still have access to the shared data records as they existed up until the time of the disconnection.

In practice, a first party having a first account for the disclosed SaaS application may have the ability to choose which aspects of its account will be connected and mirrored with a second party having a second account for the disclosed SaaS application. For example, a first party having a first account may choose to connect its account with a second party having a second account with respect to only a particular construction project and/or only a particular subset of the collaboration tools provided by the disclosed SaaS application. Further, a first party having a first account may have the ability to choose the access permissions that a second party having a second account will have with respect to the first account (e.g. read only vs. read and write permission) on a tool-by-tool basis.

Further yet, while parties with connected accounts may have access to the same collaboration tool, it is possible that one of the parties may have access to certain "internal" workflows and/or may be presented with certain "internal" data fields that will not be mirrored with other connected accounts. For example, if two connected parties are collaborating via an RFI tool to create and manage RFIs, it is possible that (1) a first party of a first account may be able to create and/or interact with an RFI data record via one or more "internal" workflows before that RFI data record is mirrored with a second party's account and/or (2) a first party of a first account may be able to include certain "internal" data fields in the RFI data record that are only stored in the first account and are not mirrored with the second party's account.

In accordance with the present disclosure, the software technology disclosed herein may involve two primary phases: (1) a first phase that involves establishing a connection between a first party having a first account and a second party having a second account via the Connections tool, and (2) a second phase that involves mirroring data records across the connected accounts. Each of these phases—which may take various forms and be carried out in various manners—are described in further detail below.

For instance, one possible example of the first phase of the disclosed process, which may involve establishing a connection between different accounts, will now be described with reference to FIG. 3.

For the purposes of illustration only, the example functions involved in the example first phase of the disclosed process are described as being carried out by a back-end platform (e.g., back-end platform 102). However, it is possible that the responsibility for carrying out the functions of the disclosed process could be distributed between a back-end platform (e.g., back-end platform 102) and one or more client stations (e.g., client stations 112, 114, and/or 116). Further, it should be understood that the flow diagram in FIG. 3 is merely described in such manner for the sake of clarity and explanation and that some functions may be carried out in various other manners as well, including the possibility that example functions may be added, removed, rearranged into different orders, grouped together, and/or not grouped together at all.

According to an example implementation, the first phase of the disclosed process may begin with a back-end platform (e.g., back-end platform 102) creating and configuring an account for a first party having a first account. For instance, a first party, such as a general contractor, interested in setting up a first account to use the disclosed construction management SaaS application may request access, via a client station associated with the general contractor (e.g., client station 112), to a first software tool of the disclosed construction management SaaS application that facilitates setting up an account for the general contractor.

In practice, a first party (e.g., a general contractor) may request access to the first tool (or any other software tool provided by the disclosed construction management SaaS application) by, for example, launching a native application on a client station associated with the first party or directing a web browser on the client station associated with the first party to a uniform resource locator (URL) for the disclosed construction management SaaS application, either of which may cause the client station to send a request to back-end platform 102 to access the first tool provided by the disclosed construction management SaaS application.

In response to receiving a request from the client station associated with the first party (e.g., the general contractor) to access the first tool provided by the disclosed construction management SaaS application, back-end platform 102 may cause the client station to present a first view of the first tool provided by the disclosed construction management SaaS application that facilitates setting up an account for the first party (e.g., general contractor). This first view may take various forms.

As one possibility, the first view may comprise various elements (e.g., menus, windows, data fields, etc.) that the first party may interact with in order to provide input that is used to create a first account for the first party. For instance, the first view of the first tool may comprise data fields that the first party (e.g., general contractor) may interact with to provide general information about the first party (e.g., organization name, contact information, etc.) and credentials (e.g., a password) for the first account to be created for the first party. The first view of the first tool may take various other forms as well.

In turn, back-end platform 102 may receive the first party's input and create the first account for the first party. In this respect, the first party (e.g., general contractor) may become the account holder of the first account.

One of ordinary skill in the art will appreciate that an account for a party may be created in various other manners as well. For instance, a first party may communicate with an employee of an organization that provides the disclosed construction management SaaS application, who may then cause a first account for the first party to be created without any interaction between the first party and the disclosed construction management SaaS application.

After creating a first account for the first party (e.g., general contractor), in some example implementations, back-end platform 102 may cause the client station associated with the first party to present a second view of the first tool provided by the disclosed construction management SaaS application that facilitates configuration of a created account. This view may take various forms.

As one possibility, the second view of the first tool may comprise various elements that the first party (e.g., general contractor) may interact with in order to provide input that is used to configure the first account. For instance, the view may comprise menus, windows, and/or data fields that the first party may interact with to (1) add users (e.g., employees of the general contractor, external collaborators, etc.) who may be permitted to use the disclosed construction management SaaS application under the first account, and/or (2) configure user permission settings that define a given user's level of access (e.g., none, read-only, read and write permissions, admin access, access to certain specified tools, etc.) to each of a plurality of tools provided by the disclosed construction management SaaS application. The second view may take various other forms, and the first party (e.g., general contractor) may interact with various other elements to configure various other settings for the general contractor's account as well.

One of ordinary skill in the art will appreciate that a party may configure a newly-created account in various other manners as well. For instance, in line with the discussion above, a first party may communicate with an employee of an organization that provides the disclosed construction management SaaS application, who may then cause a first account to be configured without any interaction between the first party and the disclosed construction management SaaS application.

Further, one of ordinary skill in the art will appreciate that various other parties may also create and configure accounts in a similar fashion described above.

In some example implementations, at some time after a first account for the first party (e.g., general contractor) has been created, the first party may wish to collaborate on a construction project with a second party having a second account for the disclosed construction management SaaS application. In order to collaborate with a second party having a second account, the first party may request access, via a client station associated with the first party (e.g., client station 112), to the Connections tool provided by the disclosed construction management SaaS application to facilitate the establishment of a connection between the first party having the first account and the second party having the second account.

It should be understood that while example implementations are described herein with respect to the first party having the first account accessing the connections tool to facilitate the establishment of a connection between the first party having the first account and the second party having the second account, it may be possible that the second party having the second account may access the connections tool to facilitate the establishment of a connection between the first party having the first account and the second party having the second account.

At block 302, in response to receiving a request from the client station (e.g., client station 112) associated with the first party having the first account to access the Connections tool, back-end platform 102 may cause the client station associated with the first party to present a first view of the Connections tool provided by the disclosed construction management SaaS application that facilitates establishing a connection between a first party having a first account and a second party having a second account. This first view of the Connections tool may take various forms.

Figure 4A:
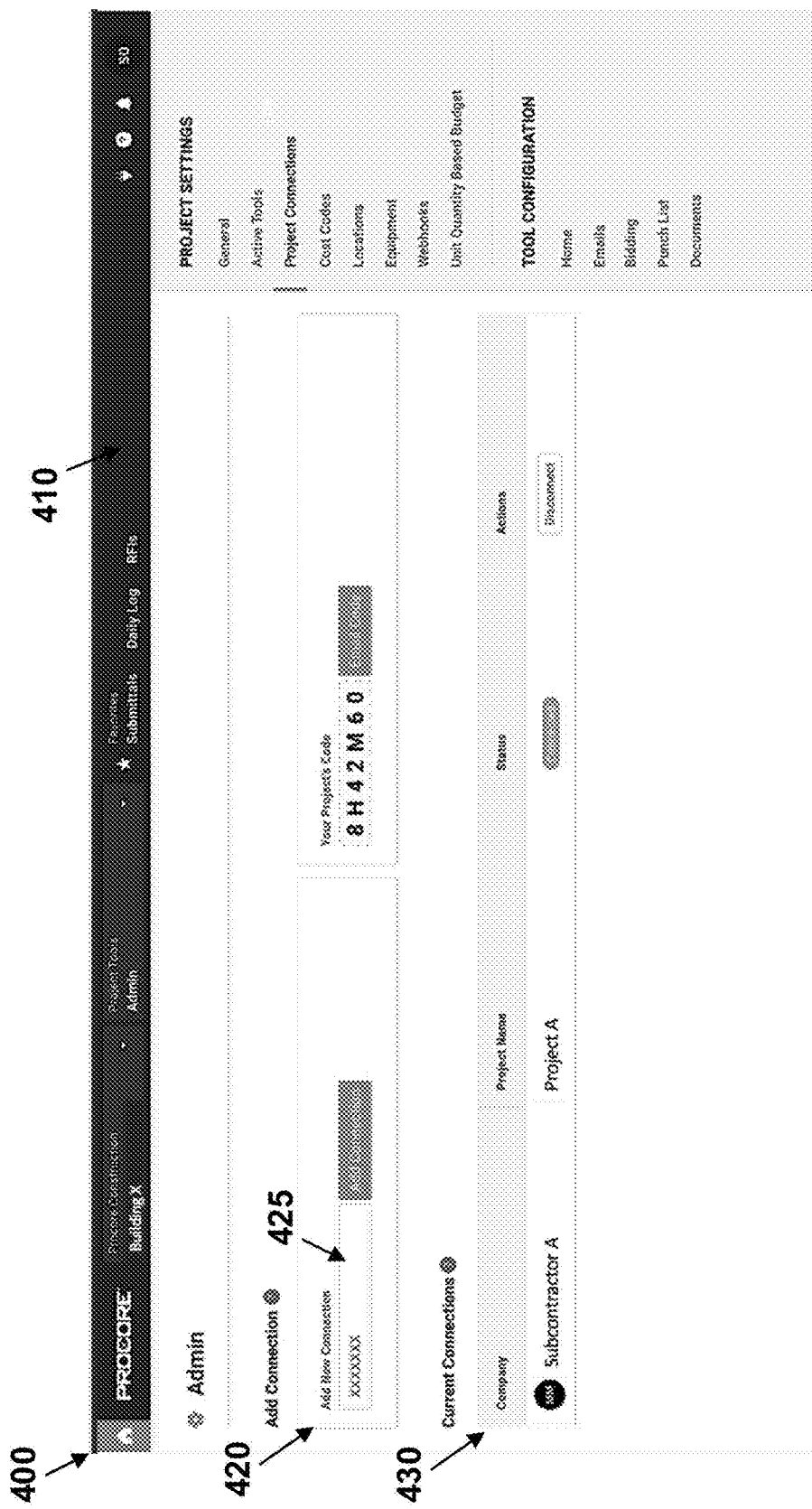
FIG. 4A depicts an example view of a software tool that may be presented to a client station.

As one example to illustrate, FIG. 4A depicts an example view 400 of the Connections tool provided by the disclosed construction management SaaS application and presented by the client station (e.g., client station 112) associated with a first party (e.g., the general contractor). As shown in FIG. 4A, view 400 may include various elements, such as menu 410, "Add Connection" region 420, "Current Connections" region 430, among other elements that are not numerically referenced. In one example implementation, a first party (e.g., general contractor) having a first account with a given permissions level (e.g., "admin" permissions) may interact with one or more of these elements, such as "Add Connection" region 420 (and perhaps other elements that are not numerically referenced in "Add Connection" region 420), in order to provide a request to add a connection with a second party having a second account.

In general, menu 410 may enable the first party to navigate to different tools available on the disclosed construction management SaaS application. Menu 410 may take various forms. As one possibility, as shown in FIG. 4A, menu 410 may take the form of a menu bar that is displayed horizontally across the top of view 400. As another possibility, as further shown in FIG. 4A, menu 410 may include one or more pull-down menus that may be used to request access to another tool available on the disclosed construction management SaaS application (e.g., the RFI tool, Budget tool, etc.), and/or one or more individual icons, such as an account icon that may be selected to view the first party's account settings and/or credentials for the disclosed construction management SaaS application. Menu 410 may take various other forms as well.

"Add Connection" region 420, which may enable the first party having a first account to add a connection with a second party having a second account, may also take various forms. For instance, as shown in FIG. 4A, "Add Connection" region 420 may include various elements (e.g., input region 425, "Add Connection" control button) that may enable a first party having a first account to add a connection with a second party having a second account. "Add Connection" region 420 may take various other forms as well.

Further, "Current Connections" region 430, which may enable the first party to view and manage its connection with a respective party, may take various forms as well. For instance, "Current Connections" region 430 may comprise a list of accounts associated with respective parties (e.g., Subcontractor A) in which a connection has been established with the first account of the first party (e.g., the general contractor) or may be established with the first account pending approval from a given party of a respective account that is listed (e.g., "Subcontractor B" shown in FIG. 4B). For each of the listed parties, "Current Connections" region 430 may include a name of a collaboration project in which the first party and the listed party are involved, a status of the connection between the listed party and the first party (e.g., "Connected," "Disconnected," or "Pending"), and an action that may be taken by the first party with respect to the listed party, examples of which may include disconnecting the listed party from the first party, and/or sending a notification to the listed party to approve a pending connection, among other examples. "Current Connections" region 430 may take various other forms as well.

In practice, while accessing the first view of the Connections tool, the first party having a first account may input a request that the first party wishes to add a connection with a second party having a second account in various manners.

In one implementation, in line with the discussion above, the first party having a first account may interact with "Add Connection" region 420 (and perhaps other elements that are not numerically referenced) in various manners in order to provide input that may be used to add a connection with a second party having a second account. For example, a general contractor may provide input data associated with a subcontractor (e.g., Subcontractor B shown in FIG. 4B) in input region 425 and then input a selection of the "Add Connection" control button in "Add Connection" region 420 to request adding a connection with the subcontractor. The data that is input in input region 425 may take various forms.

For instance, the data that is input in input region 425 may generally comprise a combination of alphanumeric characters that are associated with a subcontractor (e.g., Subcontractor B) to be added as a connection, examples of which may include a project code for a collaborative project in which the general contractor and the subcontractor are involved, the name of the subcontractor being added as a connection (e.g., "Subcontractor B"), and/or a name of the subcontractor's account (which in some instances may be the same as the subcontractor's name), among other possible examples. The data that is input in input region 425 may take various other forms as well.

As another example, the first party having the first account may interact with the "Email Code" control button in "Add Connection" region 420 in order to provide input that may be used to add a connection with a second party having a second account. For instance, the general contractor may input a selection of the "Email Code" control button and send, via the client station (client station 112) associated with the general contractor, a message comprising a code (which may take the form similar to the data that may be input in input region 425 described above) to a given subcontractor (e.g., Subcontractor B), which may then trigger back-end platform 102 to send the message comprising the code to the given subcontractor. The given subcontractor may then access, via a client station (e.g., client station 114) associated with the given subcontractor, a view of the Connections tool (e.g., view 500 of FIG. 5A) and input a request to add a connection with the general contractor (e.g., by inputting the received code in input region 525 and then inputting a selection of the "Add Connection" control button in "Add Connection" region 520 of FIG. 5A). In this respect, any party that has an account for the disclosed construction management SaaS application may be capable of requesting a connection with another party that also has an account for the disclosed construction management SaaS application.

It should be understood that a first party (e.g., a general contractor) having a first account may input a request that the first party wishes to add a connection with a second party having a second account in various other manners as well. For instance, the code mentioned above could be delivered via SMS text message to the given subcontractor at a given phone number.

At block 304, back-end platform 102 may receive, from the client station (e.g., client station 112) associated with the first party having the first account, a request to add a connection with a second party having a second account. For instance, after the general contractor inputs a request to add a connection with Subcontractor B, the client station (e.g., client station 112) associated with the general contractor may send an indication of the general contractor's request to back-end platform 102, and back-end platform 102 may receive this request. Back-end platform 102 may receive this request at various times.

For example, while accessing a first view of the Connections tool, the first party may input a selection of the "Add Connection" control button to request adding a connection with a second party having a second account, and back-end platform 102 may then receive the request to add the connection from the client station associated with the first party. As another example, while accessing a first view of the Connections tool, the first party may input data in input region 425, and back-end platform 102 may receive data from the client station associated with the first party each time the first party inputs a character in input region 425. One of ordinary skill in the art will appreciate that while a first party accesses a first view of the Connections tool, the client station (e.g., client station 112) associated with the first party and back-end platform 102 may communicate at various other times as well, such as each time the first party inputs a selection of the "Email Code" control button, as one non-limiting example.

After back-end platform 102 receives the request to add the connection with the second party having the second account, back-end platform 102 may take one or more actions based on the received request. As one possibility, back-end platform 102 may store data related to the received request in a given datastore (e.g., a datastore stored in data storage 204, or a datastore from an external data source). As another possibility, back-end platform 102 may generate an alert (e.g., an email or text message) to notify the second party that the first party wishes to add a connection with the second party. As yet another possibility, back-end platform 102 may cause the first view of the Connections tool to update to indicate that a connection with the second party is to be established pending approval from the second party. For instance, back-end platform 102 may cause view 400 of the Connections tool shown in FIG. 4A to transition to an updated view 401 shown in FIG. 4B, which may take various forms.

Figure 4B:
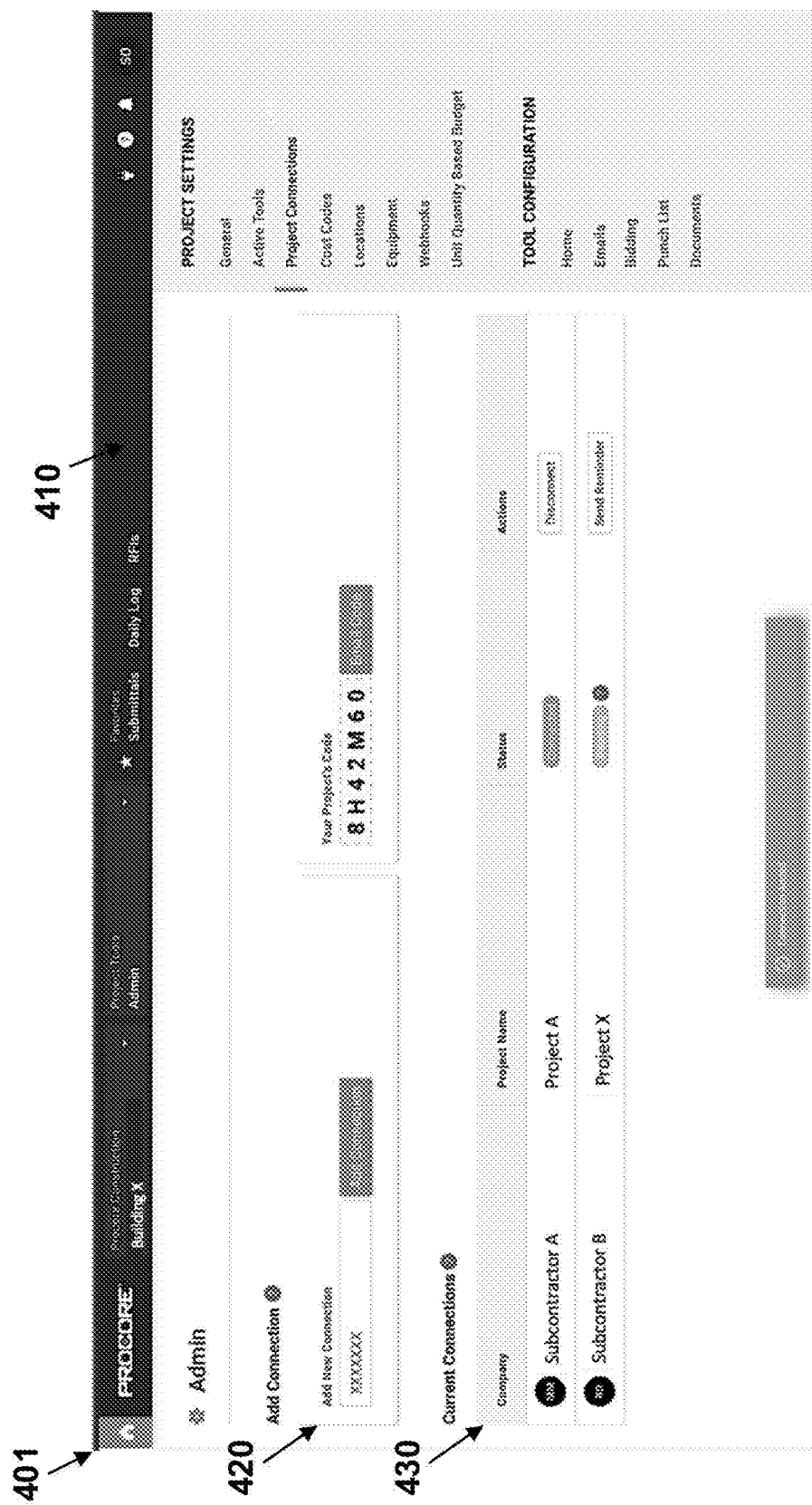
FIG. 4B depicts an example updated view of a software tool that may be presented to a client station.

As one example to illustrate, after back-end platform 102 receives the request to add a connection with the second party, "Current Connections" region 430 may be updated to indicate that a connection with the second party (e.g., Subcontractor B) is to be established pending approval from the second party (e.g., Subcontractor B). Further, as shown in FIG. 4B, "Current Connections" region 430 of updated view 401 may include a status of the connection between the second party and the first party (e.g., "Pending"), and an action that may be taken by the first party with respect to the second party (e.g., an action to send a reminder to the second party to approve the pending connection).

In line with the discussion above, in some implementations, the request to add a connection with the second party may be accompanied by some specificity as to the scope of the connection. For example, the request to add a connection with a subcontractor (e.g., Subcontractor B) may be accompanied by an indication that the connection with the second party is to be established with respect to only a particular project and/or only a particular subset of the tools provided by the disclosed SaaS application. For example, a general contractor may wish to connect with a subcontractor to share RFIs, but the general contractor may not want to share any other information (budgeting, financials, invoices, etc.). To that end, when establishing the connection, the general contractor may identify a specific tool (e.g., RFI tool), and in some embodiments specific fields within the tool (e.g., RFI data fields) that the general contractor wishes to connect. In this respect, updated view 401 may take various other forms as well.

At block 306, after back-end platform 102 receives the request to add the connection with the second party, back-end platform 102 may cause a second client station (e.g., client station 114) associated with the second party to present a second view of the Connections tool provided by the disclosed construction management SaaS application that facilitates establishing a connection between the first account of the first party and the second account of the second party. For instance, back-end platform 102 may cause the client station associated with the second party (e.g., Subcontractor B) to present a second view of the Connections tool that may facilitate the approval of a pending connection between the first party (e.g., the general contractor) and the second party, and thereby establish a connection between the parties' accounts. The second view of the Connections tool may take various forms.

Figure 5A:
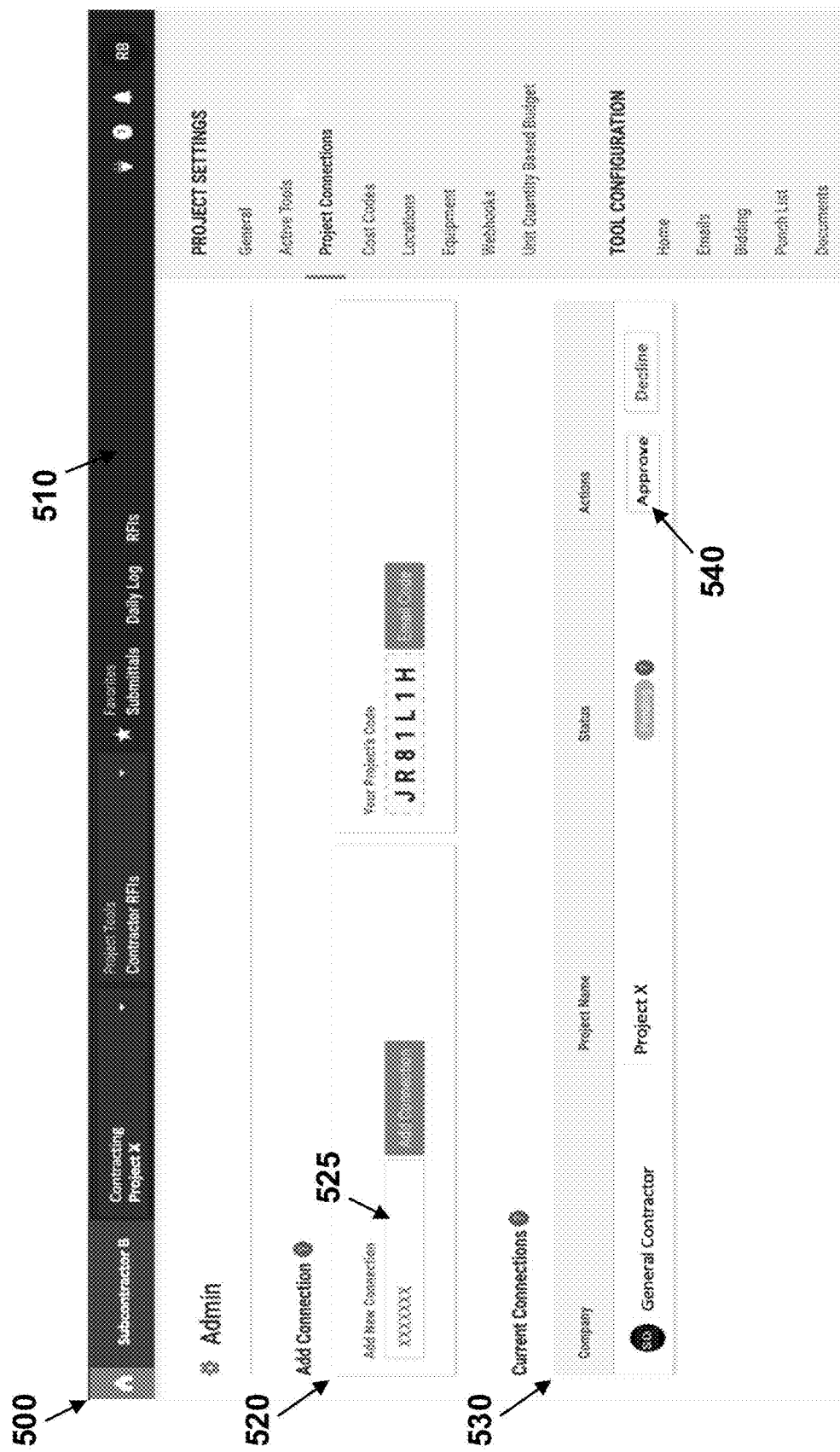
FIG. 5A depicts another example view of a software tool that may be presented to a client station.

As one example to illustrate, FIG. 5A depicts an example view 500 of the Connections tool provided by the disclosed construction management SaaS application and presented by the client station (e.g., client station 114) associated with the second party (e.g., Subcontractor B). As shown in FIG. 5A, view 500 may include various elements, such as menu 510, "Add Connection" region 520, "Current Connections" region 530, among other elements that are not numerically referenced.

In general, menu 510, "Add Connection" region 520, and "Current Connections" region 530 may take various forms similar to menu 410, "Add Connection" region 420, and "Current Connections" region 430 described above. For instance, "Current Connections" region 530 may comprise a list of accounts associated with respective parties (e.g., Subcontractor B) in which a connection has been established with the second account of the second party or may be established with the second account pending approval from the second party. For each of the listed parties, "Current Connections" region 530 may include a name of a collaboration project in which the second party and the listed party are involved, a status of the connection between the listed party and the second party (e.g., "Connected," "Disconnected," or "Pending"), and an action that may be taken by the second party with respect to the listed party, examples of which may include approving or declining to add a connection with the listed party and/or previous examples described above with respect to FIG. 4A. "Current Connections" region 530 may take various other forms as well.

In practice, while accessing the second view of the Connections tool that facilitates approving a pending connection between a first party and a second party, the second party (e.g., Subcontractor B) having the second account may input an indication that the second party wishes to approve a pending connection between the first party and the second party in various manners.

In one example implementation, the second party (e.g., Subcontractor B) may interact with "Current Connections" region 530 (and perhaps other elements) in various manners in order to provide input that may be used to approve a pending connection between the first party (e.g., general contractor) and the second party. For instance, Subcontractor B may input a selection of a "Approve" control button in "Current Connections" region 530 to approve the pending connection between the general contractor and Subcontractor B. The second party (e.g., Subcontractor B) may input an indication that the second party wishes to approve a pending connection between the first party and the second party in various other manners as well.

Further, in line with the discussion above, while accessing the second view of the Connections tool, the second party (e.g., Subcontractor B) may input an indication that the second party wishes to add a connection with another party in various manners, examples of which may include interacting with input region 525, the "Add Connection" control button, and/or the "Email Code" control button in "Add Connection" region 520 in manners similarly described above with respect to FIG. 4A.

At block 308, back-end platform 102 may receive, from the client station (e.g., client station 114) associated with the second party (e.g., Subcontractor B), a request to approve a pending connection between the first party (e.g., general contractor) and the second party (e.g., Subcontractor B). For instance, after Subcontractor B inputs an indication that it wishes to approve a pending connection between the general contractor and Subcontractor B, client station 114 associated with Subcontractor B may send a request to approve the pending connection to back-end platform 102, and back-end platform 102 may receive the request. Back-end platform 102 may receive the request at various times.

For example, while accessing the second view of the Connections tool, Subcontractor B may input a selection of the "Approve" control button in "Current Connections" region 530, and back-end platform 102 may then receive an indication of the selection from client station 114 associated with Subcontractor B. One of ordinary skill in the art will appreciate that client station 114 and back-end platform 102 may communicate at various other times as well, such as each time the second party interacts with one or more elements in "Add Connections" region 520, as one non-limiting example.

At block 310, after back-end platform 102 receives the request to approve a connection between the first party and the second party, back-end platform 102 may establish the connection between the first account of the first party and the second account of the second party. For instance, after back-end platform 102 receives such a request from client station 114, back-end platform 102 may establish a connection between the general contractor's account and Subcontractor B's account, such that the connection between the general contractor and Subcontractor B is no longer pending. Back-end platform 102 may establish the connection between the first account and the second account in various manners.

As one example, back-end platform 102 may establish the connection between the first account and the second account by storing data defining the relationship between the two connected accounts (i.e., the first account and the second account) as "connection data" in a given datastore (e.g., a datastore stored in data storage 204, or a datastore from an external data source). For instance, back-end platform 102 may establish the connection between the general contractor and Subcontractor B by storing connection data in a given datastore that defines the relationship between the general contractor and Subcontractor B, which may include some specificity as to the scope of the connection as described above. For example, the connection data may include information about specific projects between the general contractor and Subcontractor B that are connected. As another example, the connection data may include information about specific tools that are connected (e.g., RFIs, submittals, daily log, incidents, punch items, etc.). It should be understood that in some embodiments, only certain tools may be selected for connection (for example as specified by a user). In other embodiments, all tools may be selected for connection. Back-end platform 102 may establish the connection between the first account and the second account in various other manners as well.

Figure 5B:
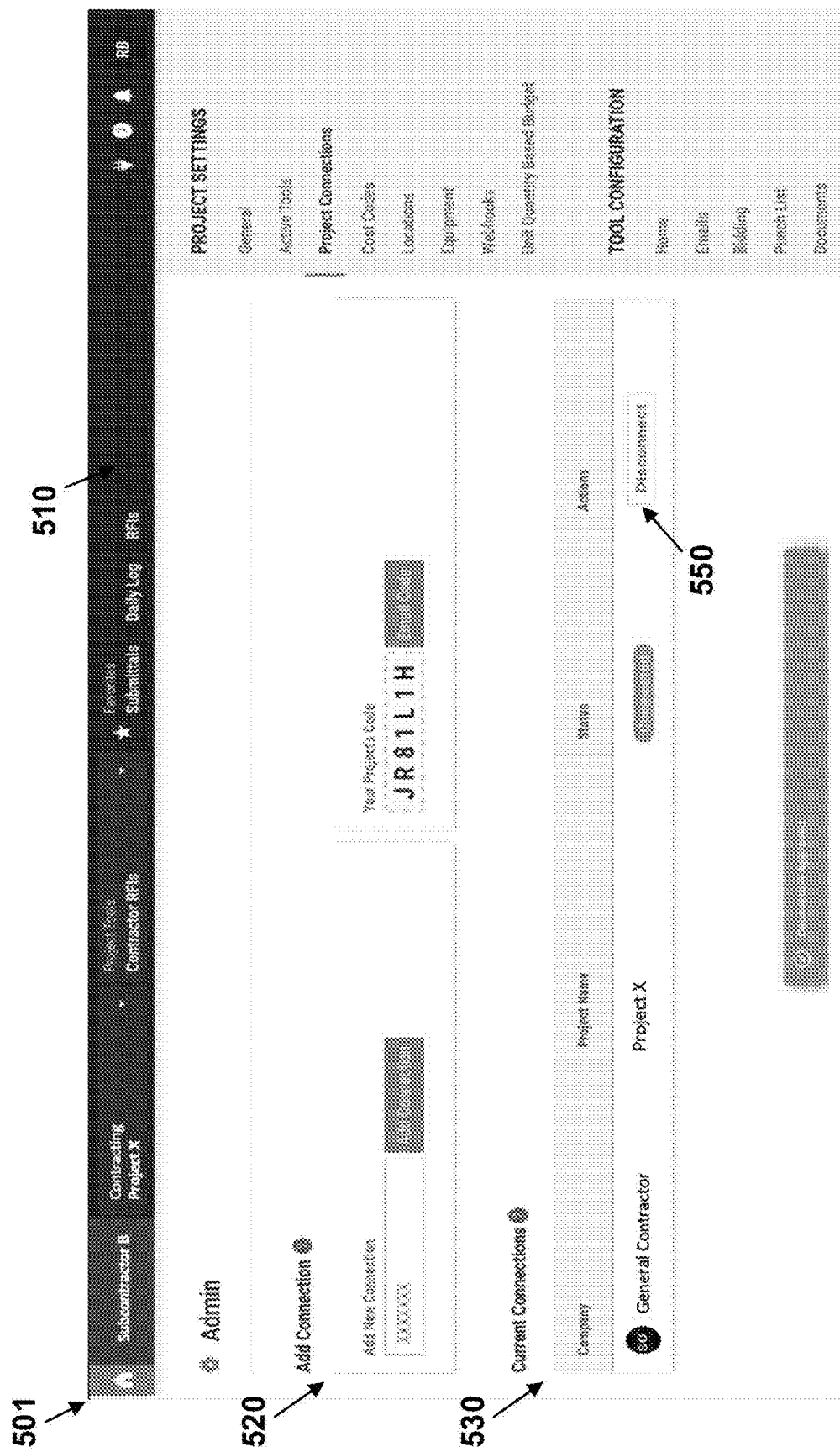
FIG. 5B depicts another example updated view of a software tool that may be presented to a client station.

In some implementations, after back-end platform 102 receives the request to approve a pending connection between the first party and the second party, back-end platform 102 may take one or more other actions based on the received request. As one possibility, back-end platform 102 may generate an alert (e.g., an email, a text message, an in-app notification, etc.) to notify the first party (e.g., the general contractor) and perhaps the second party (e.g., Subcontractor B) that the second party has approved the pending connection between the first party and the second party. As yet another possibility, back-end platform 102 may cause the second view of the Connections tool to update in order to provide an indication that a connection between the first account of the first party and the second account of the second party has been established. For instance, back-end platform 102 may cause view 500 of the Connections tool shown in FIG. 5A to transition to an updated view 501 shown in FIG. 5B, which may take various forms.

As one example to illustrate, after back-end platform 102 receives the request to approve a pending connection between the general contractor and Subcontractor B, the status of the connection between the general contractor and Subcontractor B may be updated in "Current Connections" region 530 from "Pending" to "Connected" in order to indicate that a connection between the general contractor's account and Subcontractor B's account has been established. As further shown in FIG. 5B, "Current Connections" region 530 of updated view 501 may include an updated action that may be taken by the second party (e.g., Subcontractor B) with respect to the first party (e.g., an action to disconnect the connection between the first party and the second party). Updated view 501 may take various other forms as well.

In one implementation, there may be a "Details" button (not shown) that provides a detailed view of additional information about the connection. For example, in response to an input selecting the "Details" button, back-end platform 102 may cause a client station to display information identifying what information (or what tools) is currently being mirrored across the connected accounts. For example, the information may identify that the RFI tool (or data fields of a given RFI) is currently being mirrored across connected accounts and that connection to other tools is pending. In addition, the displayed information may include elements that allow a party to disconnect a connection with another party with respect to some (or all) of the connected tools.

Once back-end platform 102 establishes a connection between the first account of the first party and the second account of the second party, the disclosed process may transition from the first phase to the second phase, which generally involves mirroring data records across the connected accounts (e.g., the first account and the second account). The second phase of the disclosed process may take various forms and the functions carried out in the second phase may be carried out in various manners.

In one implementation, in order to facilitate the mirroring of data records across connected accounts (e.g., the first account and the second account), back-end platform 102 may comprise a first software routine associated with the originator of a data record and a second software routine associated with the target of the data record (i.e., the party who receives a shared data record). As noted above, a first party who creates a data record under the first party's account that is to be mirrored across a second party's account may be referred to herein as the "originator" of the data record, and the second party who receives the mirrored data record may be referred to herein as the "target" of the data record. The first software routine associated with the originator of a data record and the second software routine associated with the target of the data record may take various forms and may carry out various functions in various manners.

Figure 6:
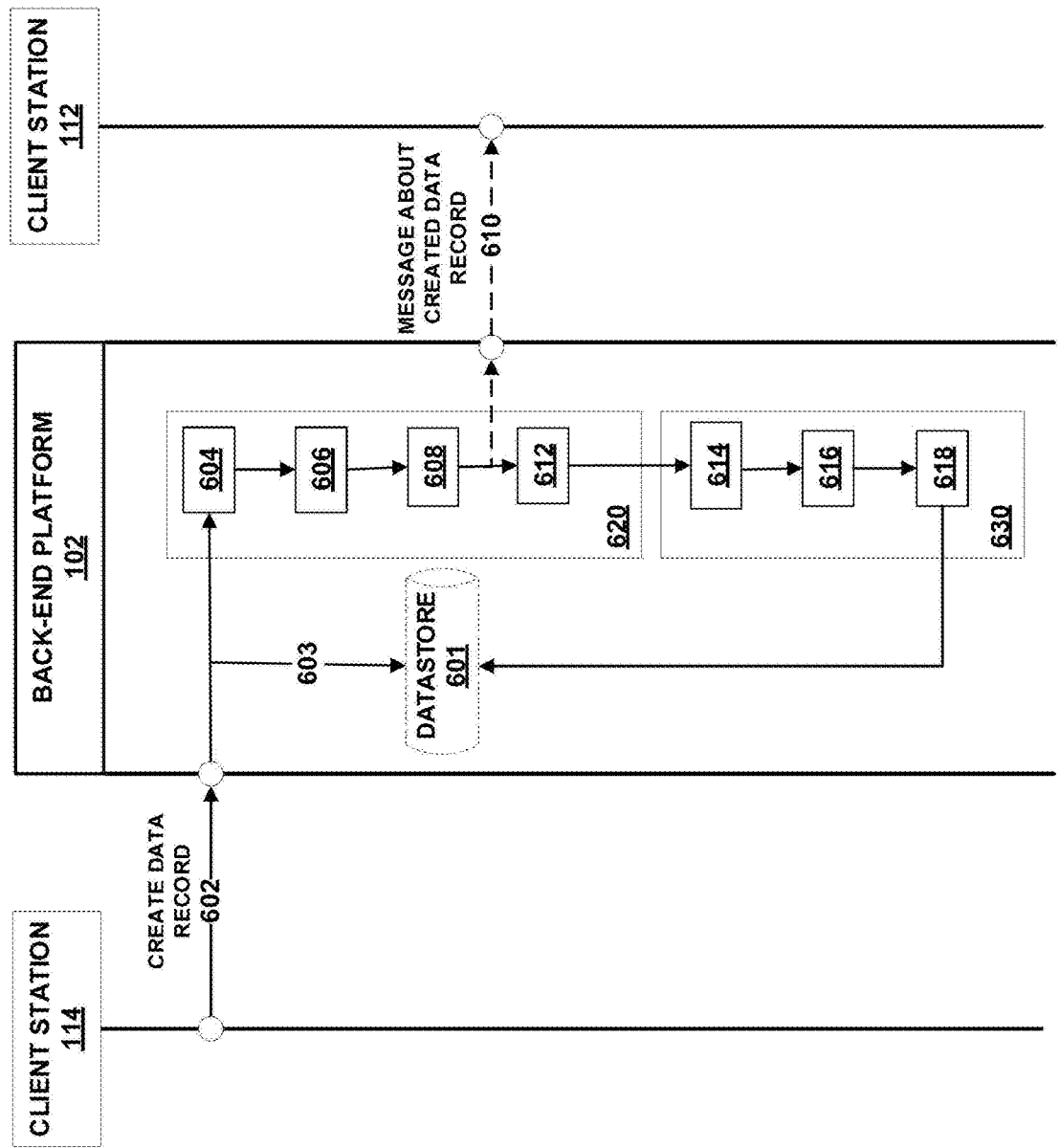
FIG. 6 depicts an example flow diagram that illustrates the second phase of the disclosed process.

To illustrate, FIG. 6 shows an example flow diagram that illustrates one possible example of an interaction involving two connected accounts (e.g., the first account of the first party and the second account of the second party) and back-end platform 102, which comprises first software routine 620 and second software routine 630. For purposes of illustration, the example interaction is facilitated by (1) client station 112, which may be operated by a first party (e.g., the general contractor) that may be the target of a data record, (2) client station 114, which may be operated by a second party (e.g., Subcontractor B) that may be the originator of the data record, and (3) back-end platform 102, which comprises first software routine 620 and second software routine 630. However, it should be understood that other entities may carry out the example functions described below. Likewise, it should be understood that the disclosed process is merely described in this manner for the sake of clarity and explanation and that the interaction may be carried out in various other manners as well, including the possibility that functions may be added, removed, rearranged into different orders, combined into fewer blocks, and/or separated into additional blocks depending upon the particular embodiment.

In order to carry out the example interaction, the first account holder may interact with client station 112 to access a given tool provided by the disclosed construction management SaaS application that facilitates creation of a respective type of data record. For instance, the second party (e.g., Subcontractor B) may interact with client station 114 to access the RFI tool described above that facilitates creation of an RFI data record.

While accessing the given tool of the disclosed SaaS application, the second party may then interact with a view of the given tool to create a respective type of data record. For instance, while accessing a view of the RFI tool, Subcontractor B may interact with one or more elements (e.g., menus, control buttons, data fields, etc.) in the view, which may take various forms.

Figure 7:
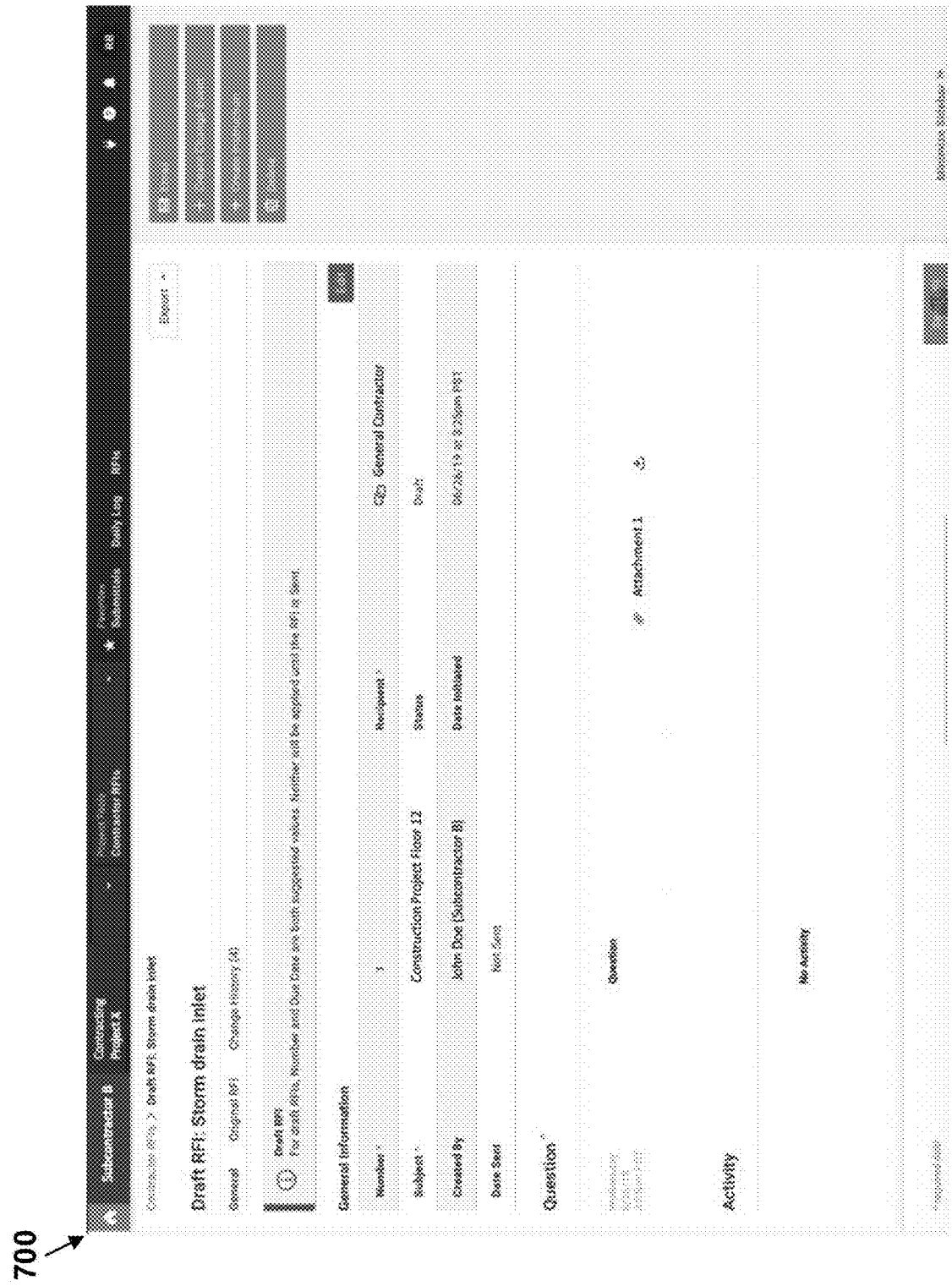
FIG. 7 depicts an example view of another software tool that may be presented to a client station.

As one example to illustrate, FIG. 7 shows an example view 700 of an RFI tool that may be used by the second party (e.g., Subcontractor B) to create an RFI data record. As shown, view 700 includes various data fields in which the second party may interact with to create an RFI data record. For example, the second party may interact with one or more data fields that provide general information about the RFI data record being created, examples of which may include a "Subject" field that provides a descriptive title for the RFI, a "Date Initiated" field that provides the creation date of the RFI, a "Created By" field that provides the name of a user creating the RFI, a "Date Sent" field that provides the date in which the RFI was sent, a "Recipient" field that lists the target of the RFI, and/or a "Status" field that provides the status of the RFI. Although not shown, the second party may also interact with an "Assignees" field that designates one or more project team members to respond to the RFI data record being created (which may include one or more users under the first account of the first party (e.g., employees and external collaborators of the general contractor) as described above and perhaps one or more users under the second account of the second party (e.g., employees of Subcontractor B)).

As another example, as shown in FIG. 7, the second party may interact with one or more data fields associated with a formal question related to a construction project that requires a response from one or more assignees (e.g., a "Question" field), and/or background information that provides additional context about the formal question (e.g., a "Drawing Number" field (not shown), a "Location" field (not shown), etc.).

As yet another example, although not shown, the second party may interact with one or more "internal" data fields or "internal" data records that may be confidential in nature to the second party and thus, may not be shared with other account holders. For instance, the second party may interact with a "Cost Impact" field (not shown) that may be an "internal" data field that provides a specific amount by which cost will be impacted by an issue to be disclosed in the RFI data record being created. The second party may also interact with a "private" field that may enable a respective data field to be marked as an "internal" data field, or perhaps enable the entire RFI data record being created to be marked as an "internal" data record that may not be shared with other account holders. Further yet, the second party may interact with a "custom" field (not shown) that may enable the second party to create a custom data field for the RFI data record which may be marked as an "internal" data record that may not be shared with other account holders.

As a further example, although not shown, the second party may interact with a "change history" log that summarizes all of the changes made to a given RFI throughout its lifecycle. In this respect, for each change that was made to the given RFI, the change history log may include a date in which the change was made to the given RFI, a name of the individual who made the change, and/or information about what was changed, among other possible information.

While accessing the given tool provided by the disclosed construction management SaaS application, the originator of a data record (e.g., the second party) may interact with a view of the given tool in various other manners as well.

Referring back to FIG. 6, at 602, back-end platform 102 may then create a data record under the originator's account (e.g., the second account of the second party) based on data received from a client station (e.g., client station 114) associated with the originator (e.g., the second party). For instance, back-end platform 102 may receive data for an RFI to be created from client station 114 associated with the second party (e.g., Subcontractor B), where the data for the RFI may comprise data corresponding to one or more of the respective data fields described above with respect to FIG. 7. One of ordinary skill in the art will appreciate that back-end platform 102 may create a data record in various other manners as well.

After back-end platform 102 creates the data record, back-end platform 102 may take one or more actions.

For instance, at block 603, after the data record is created under the originator's account (e.g., the second account of the second party), back-end platform 102 may store the created data record under the originator's account (e.g., the second account of the second party), which may involve storing the created data record in a given datastore associated with the originator (e.g., the second party) such as datastore 601.

For purposes of illustration, back-end platform 102 is shown to comprise datastore 601. However, one of ordinary skill in the art will appreciate that datastore 601 may be a datastore that is external to back-end platform 102 (i.e., an external data source described above).

Further, after the data record is created under the originator's account (e.g., the second account of the second party), back-end platform 102 may carry out various functions via first software routine 620 to facilitate mirroring the created data record across connected accounts (e.g., the first account of the first party). Some examples of these functions are discussed below.

At 604, first software routine 620 of back-end platform 102 may determine whether the created data record is to be mirrored with a connected account (e.g., first account of the first party), which may be determined in various manners. As one example, based on connection data that may be stored in a given datastore under the originator's account (e.g., the second account of the second party), first software routine 620 may identify that the first party and the second party are connected (and possibly that the proper projects and tools are connected) and thus, determine that the data record created under the second account is to be mirrored with the first account. As another example, based on the connection data described above and data indicating that the data record created under the originator's account (e.g., the second account) is not an "internal" data record, first software routine 620 may determine that the data record created under the originator's account (e.g., the second account) is to be mirrored with the first account of the first party. First software routine 620 of back-end platform 102 may determine whether the created data record is to be mirrored with a connected account (e.g., the first account) in various other manners as well.

At 606, after determining that the created data record is to be mirrored with the connected account (e.g., first account of the first party), first software routine 620 may generate a "thread ID" that is mapped to the created data record. For instance, returning to a previous example, first software routine 620 may generate a thread ID that is mapped to the RFI data record created under the second account of the second party (e.g., Subcontractor B).

Generally speaking, a "thread ID" may be generated when a new data record is created, and may be later used to identify the created data record stored under the originator's account (e.g., the second account of the second party) and mirrored across a respective target's account (e.g., the first account of the first party), such that any subsequent update to the created data record made under one of the connected accounts can be propagated to the corresponding data record under the other connected account. A thread ID may take various forms.

As one possibility, a thread ID may take the form of a Universally Unique Identifier ("UUID"), which may be a 128-bit number used to uniquely identify a data record that has been created. This may ensure with near certainty that a given thread ID that is generated and mapped to a newly created data record does not duplicate another thread ID that has been, or will be, generated and mapped to another created data record. One of ordinary skill in the art will appreciate that a thread ID may take various other forms to uniquely identify a data record that has been created (e.g., any combination of alphanumeric characters).

At 608, after generating and mapping the thread ID to the created data record, first software routine 620 may generate a message that comprises at least a portion of the data from the created data record, the thread ID, and perhaps various other information.

For example, in addition to the thread ID, the message may comprise various content from the created data record, which may include some or all of the data corresponding to respective data fields of the created data record. For instance, the message may comprise one or more data fields that are not "internal" data fields. In particular, with respect to the previous example involving the RFI data record created under the second account of the second party (e.g., Subcontractor B), the content of the message may comprise one or more data fields that provide general information about the RFI, one or more data fields associated with a formal question related to a project that requires a response from one or more assignees, and/or one or more data fields that adds additional context to the formal question (e.g., "Drawing Number" field, a "Location" field, etc.). One or more data fields that may be "internal" data fields (e.g., "Cost Impact" field) may be excluded from the content of the message.

As another example, in addition to the thread ID, the message may comprise general information about the message. For instance, the message may comprise a "message ID" that is generated and mapped to the message being created in order to identify the message, and/or a timestamp that identifies when the message was created. Additionally, the message may comprise information about the originator of the data record (e.g., the second party), which may include information about the originator's account, information about a user under the originator's account who may have created the data record, and/or information about a project associated with the created data record. Similarly, the message may comprise information about a target of the data record (e.g., the first party), which may include information about the target's account, information about a user under the target's account who may be an administrator of the target's account or identified in the data record as a recipient (perhaps as one of the assignees), and/or information about a project associated with the created data record.

The message generated by first software routine 620 may include various other information as well.

In practice, the message generated by first software routine 620 may be encoded in a standard format adopted by both the originator of a data record and a respective target of the data record. For instance, the message may be encoded in a proprietary file format or an open-standard file format, such as JavaScript Object Notation ("JSON"). One of ordinary skill in the art will appreciate that the message may take various other forms as well.

At 610, after the message is generated, first software routine 620 may optionally generate an alert and back-end platform 102 may then send the alert to the client station (e.g., client station 112) associated with the target (e.g., the first party) to notify the target that the message has been generated. In this respect, first software routine 620 may optionally alert a client station associated a respective target each time a new data record is created under the originator's account and first software routine 620 determines that the newly created data record is to be mirrored with the target's account.

At 612, after the message is generated, first software routine 620 may provide the generated message to second software routine 630 of back-end platform 102 that is associated with the target (e.g., the first party) of the created data record in order to facilitate mirroring of the created data record to the target's account (e.g., the first of the first party). For instance, first software routine 620 may send the generated message that comprises the thread ID mapped to the created RFI data record and at least some of the data from the respective RFI data fields (along with perhaps some other general information about the message described above) to second software routine 630 of back-end platform 102 that is associated with the first party (e.g., the general contractor).

At 614, second software routine 630 of back-end platform 102 may then receive the generated message regarding the created data record (e.g., RFI data record) under the originator's account (e.g., the second account of the second party). One of ordinary skill in the art will appreciate that second software routine 630 may receive the generated message in various manners.

At 616, after receiving the generated message, second software routine 630 may create a data record under the target's account (e.g., the first account of the first party) that corresponds to the data record created under the originator's account. Second software routine 630 may create the data record under the target's account in various manners.

As one possibility, second software routine 630 may extract contents of the received message, and create a data record under the target's account that comprises the extracted contents. For instance, second software routine 630 may extract contents of the received message that may include data corresponding to some of the data fields from the RFI data record (e.g., one or more data fields that are not "internal" data fields described above) created under the second account of the second party (e.g., Subcontractor B), and create a RFI data record under the first account of the first party (e.g., the general contractor) that comprises those data fields.

Second software routine 630 may create the data record under the target's account in various other manners as well.

It should be understood that in some implementations, second software routine 630 may forego creating a data record under the target's account. Instead, the second software routine 630 may extract the thread ID included in the received message such that it may maintain a mapping between the thread ID and the data record created under the originator's account. In this respect, the target may later access the data record created under the originator's account by referencing the thread ID mapped to the data record.

In turn, at 618, second software routine 630 may maintain a mapping between the thread ID included in the received message and the data record created under the target's account and store the created data record under the target's account. For instance, second software routine 630 may maintain the mapping between the same thread ID that was mapped to the RFI data record created under the originator's account (e.g., the second account of the second party) and an RFI data record created under the target's account (e.g., the first account of the first party), and then store the created RFI data record and the corresponding thread ID under the target's account in datastore 601.

In this respect, a data record created by the originator under the originator's account can be mirrored with a respective target's account that is connected to the originator's account, and the mirrored data record may exist in both the originator's account and the respective target's account.

While datastore 601 is shown to store a data record created under an originator's account and a corresponding data record created under a target's account, it should be understood that each data record created under a respective account may be stored in different datastores.

In line with the discussion above, it should be understood that in some implementations, second software routine 630 may forego creating a corresponding data record under the target's account, and thus, may not store a corresponding data record under the target's account. Instead, second software routine 630 may store a mapping between the thread ID and the data record created under the originator's account such that the target may later access the data record created under the originator's account by referencing the thread ID mapped to the data record without storing a corresponding data record under the target's account.

Thereafter, first software routine 620 and second software routine 630 may use the thread ID mapped to the mirrored data record to propagate any updates to the mirrored data record either made under the originator's account or the respective target's account. The functions performed by first software routine 620 and second software routine 630 to propagate an update to a data record either made under the originator's account or a respective target's account may take various forms and may be performed in various manners.

In one example implementation, if the originator (e.g., the second party) later updates a data record created under the originator's account, first software routine 620 may (1) detect the update to the data record under the originator's account, (2) based on a thread ID that is mapped to the data record (and perhaps also based on the connection data), determine that the data record is mirrored with a respective target's account, (3) generate a message that reflects the update to the data record, and (4) provide the message to second software routine 630, such that the message is provided to the respective target's account. In turn, the message may be received and processed by second software routine 630 associated with the target of the data record, such that the corresponding data record under the target's account is updated accordingly.

In one specific example, if the originator (e.g., the second party) later updates the RFI data record created under the originator's account, first software routine 620 may detect the update to the RFI data record under the originator's account. Based on the thread ID that was mapped to the RFI data record (and perhaps also based on the connection data), first software routine 620 may then determine that the RFI data record is mirrored with the target's account (e.g., the first account of the first party). In turn, first software routine 620 may generate a new message that reflects the update to the RFI data record. The new message may comprise various information previously described with respect to the message generated at 608 (e.g., the thread ID mapped to the RFI data record, general information about the message, and one or more data fields that have been updated). Second software routine 640 may then receive the new message that reflects the update to the RFI data record from first software routine 630, and second software routine 640 may then process the new message (e.g., extract contents of the message) to update the corresponding RFI data record under the target's account.

On the other hand, if the target party (e.g., the first party) later updates the mirrored data record, second software routine 630 may (1) detect the update to the data record at the target's account, (2) determine based on the thread ID (and perhaps also based on the connection data) that the data record is mirrored with the originator's account, (3) generate a new message that reflects the update to the data record, and (4) provide the message to first software routine 620, such that the message is provided to the originator's account. In turn, the message may be received and processed by first software routine 620 associated with the originator of the data record, such that the corresponding data record under the originator's account is updated accordingly.

In some instances, each time a mirrored data record is updated by a connected party (e.g., the originator or target party), back-end platform 102 may store the updated information in a given data store (e.g., a datastore stored in data storage 204, or a datastore from an external data source) associated with each connected party's account, such that the updated information is linked to the mirrored data record in each connected party's account in a manner that allows a connected party to track updates made to the mirrored data record. In this respect, a connected party may be able to view a change history log of a mirrored data record that summarizes all of the updates made to the mirrored data record throughout its lifecycle. In line with the discussion above, the change history log of a mirrored data record (e.g., a mirrored RFI data record) may include a date in which the update was made, a name of the individual who made the update, and/or information about what was updated, among other possible information. The functions performed by first software routine 620 and second software routine 630 to propagate an update to a data record either made under the originator's account or a respective target's account may take various other forms and may be performed in various other manners as well.

In practice, in line with the discussion above, first software routine 620 and second software routine 630 may use rules or other logic (sometimes referred to as "gates") as a basis for determining what contents (e.g., data fields) of a created or updated data record (if any) is to be mirrored with a connected account. In this respect, the rules may be based on factors such as the type of data record (e.g., RFI data record), the type of data field(s) that have been populated/updated (e.g., "internal" data fields vs. data fields that are not "internal" data fields), the role of the party that holds a connected account (e.g., a general contractor vs. a subcontractor), etc. Additionally or alternatively, the party that is creating or updating a data record may interact with its respective client station (e.g., client station 112 or client station 114) to manually select which fields of a created or updated data record (if any) are to be mirrored with a connected account (which may be accomplished by interacting with the "private" and/or "custom" data fields discussed above with respect to an RFI data record), in which case the first and second software routines may use this input as a basis for determining which fields of a created or updated data record (if any) are to be mirrored with a connected account.

Further, in practice, at some point in time after a connection is established between a first account of a first party and a second account of a second party, one of the connected parties (e.g., the first party or the second party) may wish to "disconnect" its account from the other connected account. For example, after a collaboration project between a general contractor and a subcontractor (e.g., Subcontractor B) is complete, the general contractor may wish to disconnect its account from the subcontractor's account, or vice versa. A party may "disconnect" its account from another account in various manners.

To illustrate one example, a subcontractor (e.g., Subcontractor B) may access a view of Connections tool to disconnect its account from a general contractor's account. For instance, in line with the discussion above, the subcontractor (e.g., Subcontractor B) may access a view similar to view 501 of FIG. 5B, and interact with a control button (e.g., "Disconnect" control button 550 in "Current Connections" region 530) that may trigger back-end platform 102 to receive a request to disconnect the subcontractor's account from the general contractor's account.

A party may "disconnect" its account from another account in various other manners as well.

After a party disconnects its account from another party's account, both disconnected parties may still have access to any mirrored data records under their respective accounts as they existed up until the time of the disconnection. Accordingly, the disconnected parties may be able to reference information from the mirrored data records that may become relevant to an issue on a future project.

In line with the discussion above, in some implementations where a corresponding data record has not been created nor stored under the target's account (and only a mapping between a given thread ID and a given data record created under the originator's account has been stored under the target's account), back-end platform 102 may create a data record under the target's account that corresponds to a given data record stored under the originator's account and mapped to a given thread ID at the time of the disconnection. In this manner, the disconnected parties may have access to any data record under their respective accounts that was mapped to a thread ID.

One of ordinary skill in the art will appreciate that back-end platform 102 may perform various other functions while running the disclosed construction management SaaS application as well, which may depend in part on the manner in which a given party interacts with a given tool provided by the disclosed SaaS application.

Further, while an example implementation of the first phase has been described above with respect to a general contractor requesting to add a connection with a subcontractor (e.g., Subcontractor B) and the subcontractor approving a pending connection between the general contractor and the subcontractor, it should be understood that any party having an account for the disclosed construction management SaaS application may request to add a connection with another party having an account for the disclosed SaaS application, and any party may approve a pending connection between the party and another party in order to establish a connection.

Further yet, while an example implementation of the second phase has been described above with respect to the second party (e.g., Subcontractor B) having a second account creating a data record as the originator of the data record and the first party (e.g., the general contractor) having a first account receiving the mirrored data record as the target of the data record, it should be understood that the first party may create a respective data record as the originator the data record and the second party may receive the mirrored data record as the target of the data record.

Still further, as noted above, a party having an account for the disclosed construction management SaaS application may have the ability to choose which aspects of its account will be connected and mirrored with another party's account. For example, a first party may choose to connect its account with a second party's account in connection with only a particular project and/or only a particular subset of the collaboration tools provided by the disclosed construction management SaaS application. Further, a first party may have the ability to choose the access permissions that a second party will have with respect to the first party's account (e.g. read only vs. read and write permission) on a tool-by-tool basis.

IV. CONCLUSION

Example embodiments of the disclosed innovations have been described above. Those skilled in the art will understand, however, that changes and modifications may be made to the embodiments described without departing from the true scope and spirit of the present invention, which will be defined by the claims.

Further, to the extent that examples described herein involve operations performed or initiated by actors, such as "humans," "operators," "users," "parties," or other entities, this is for purposes of example and explanation only. Claims should not be construed as requiring action by such actors unless explicitly recited in claim language.

What is claimed is:

1. A computing system comprising:
a network interface;
at least one processor;
a non-transitory computer-readable medium; and
program instructions stored on the non-transitory computer-readable medium that are executable by the at least one processor to cause the computing system to perform functions including:
determining that an origin data record created under a first account of a first party associated with a construction project is to be mirrored to a second account of a second party associated with the construction project that has an established connection with the first account of the first party, wherein the origin data record created under the first account of the first party comprises a given set of data related to the construction project;
generating a thread identification that is mapped to the origin data record created under the first account of the first party; and
generating a first message that comprises (1) data from the origin data record created under the first account of the first party and (2) the thread identification that is mapped to the origin data record created under the first account of the first party, wherein the data from the origin data record comprises at least a subset of the given set of information related to the construction project;

based on the first message, creating a target data record under the second account of the second party that corresponds to the origin data record created under the first account of the first party, wherein the target data record created under the second account of the second party comprises the subset of the given set of information related to the construction project; and storing the target data record under the second account of the second party.

2. The computing system of claim 1, further comprising program instructions stored in the non-transitory computer-readable medium that are executable by the at least one processor to cause the computing system to perform functions comprising:

disconnecting the first account of the first party and the second account of the second party; and continuing to store the target data record under the second account of the second party.

3. The computing system of claim 1, further comprising program instructions stored in the non-transitory computer-readable medium that are executable by the at least one processor to cause the computing system to perform functions comprising:

before determining that the origin data record created under a first account of a first party is to be mirrored to the second account of the second party, establishing the connection between the first account of the first party and the second account of the second party.

4. The computing system of claim 3, wherein establishing the connection between the first account of the first party and the second account of the second party comprises:

receiving, from a first client station associated with the first party, a request to establish the connection with the second party;

receiving, from a second client station associated with the second party, a request to approve the connection between the first party and the second party; and storing connection data that defines the connection between the first account of the first party and the second account of the second party.

5. The computing system of claim 1, wherein determining that the origin data record created under the first account of the first party is to be mirrored to the second account of the second party comprises determining that the origin data record created under the first account of the first party is to be mirrored to the second account of the second party based at least on connection data that defines the connection between the first account of the first party and the second account of the second party.

6. The computing system of claim 1, wherein the origin data record created under the first account of the first party is a data record that defines a Request For Information ("RFI").

7. The computing system of claim 1, wherein the thread identification that is mapped to the origin data record created under the first account of the first party comprises a Universally Unique Identifier ("UUID").

8. The computing system of claim 1, further comprising program instructions stored in the non-transitory computer-readable medium that are executable by the at least one processor to cause the computing system to perform functions comprising:

generating an alert indicating that the origin data record created under the first account of the first party is to be mirrored to the second account of the second party.

9. The computing system of claim 1, further comprising program instructions stored in the non-transitory computer-readable medium that are executable by the at least one processor to cause the computing system to perform functions comprising:

detecting an update to the target data record created under the second account of the second party;

determining that the target data record created under the second account of the second party corresponds to the origin data record created under the first account of the first party;

generating a second message comprises (1) data reflecting the update to the target data record created under the second account of the second party and (2) the thread identification; and based on the second message, updating the origin data record created under the first account of the first party.

10. The computing system of claim 9, wherein determining that the target data record created under the second account of the second party corresponds to the origin data record created under the first account of the first party comprises determining that the target data record created under the second account of the second party corresponds to the origin data record created under the first account of the first party based one or more of (1) the thread identification or (2) connection data that defines the connection between the first account of the first party and the second account of the second party.

11. A method performed by a computing system, the method comprising:

determining that an origin data record created under a first account of a first party associated with a construction project is to be mirrored to a second account of a second party associated with a construction project that has an established connection with the first account of the first party, wherein the origin data record created under the first account of the first party comprises a given set of data related to the construction project;

generating a thread identification that is mapped to the origin data record created under the first account of the first party; and generating a first message that comprises (1) data from the origin data record created under the first account of the first party and (2) the thread identification that is mapped to the origin data record created under the first account of the first party, wherein the data from the origin data record comprises at least a subset of the given set of information related to the construction project;

based on the first message, creating a target data record under the second account of the second party that corresponds to the origin data record created under the first account of the first party, wherein the target data record created under the second account of the second party comprises the subset of the given set of information related to the construction project; and storing the target data record under the second account of the second party.

12. The method of claim 11, further comprising:

disconnecting the first account of the first party and the second account of the second party; and continuing to store the target data record under the second account of the second party.

13. The method of claim 11, further comprising:

before determining that the origin data record created under a first account of a first party is to be mirrored to the second account of the second party, establishing the connection between the first account of the first party and the second account of the second party.

14. The method of claim 11, wherein establishing the connection between the first account of the first party and the second account of the second party comprises:
- receiving, from a first client station associated with the first party, a request to establish the connection with the second party;
- receiving, from a second client station associated with the second party, a request to approve the connection between the first party and the second party; and
- storing connection data that defines the connection between the first account of the first party and the second account of the second party.

15. The method of claim 11, wherein determining that the origin data record created under the first account of the first party is to be mirrored to the second account of the second party comprises determining that the origin data record created under the first account of the first party is to be mirrored to the second account of the second party based at least on connection data that defines the connection between the first account of the first party and the second account of the second party.

16. The method of claim 11, wherein the origin data record created under the first account of the first party is a data record that defines a Request For Information ("RFI").

17. The method of claim 11, further comprising:
- detecting an update to the target data record created under the second account of the second party;
- determining that the target data record created under the second account of the second party corresponds to the origin data record created under the first account of the first party;
- generating a second message comprises (1) data reflecting the update to the target data record created under the second account of the second party and (2) the thread identification; and
- based on the second message, updating the origin data record created under the first account of the first party.

18. A non-transitory computer-readable storage medium, wherein the non-transitory computer-readable storage medium is provisioned with program instructions that are executable to cause a computing system to:
- determine that an origin data record created under a first account of a first party associated with a construction project is to be mirrored to a second account of a second party associated with a construction project that has an established connection with the first account of the first party;
- generate a thread identification that is mapped to the origin data record created under the first account of the first party, wherein the origin data record created under the first account of the first party comprises a given set of data related to the construction project; and
- generate a first message that comprises (1) data from the origin data record created under the first account of the first party and (2) the thread identification that is mapped to the origin data record created under the first account of the first party, wherein the data from the origin data record comprises at least a subset of the given set of information related to the construction project;
- based on the first message, create a target data record under the second account of the second party that corresponds to the origin data record created under the first account of the first party, wherein the target data record created under the second account of the second party comprises the subset of the given set of information related to the construction project; and
- store the target data record under the second account of the second party.

19. The non-transitory computer-readable storage medium of claim 18, further comprising program instructions stored in the non-transitory computer-readable storage medium that are executable to cause the computing system to:
- disconnect the first account of the first party and the second account of the second party; and
- continue to store the target data record under the second account of the second party.

20. The non-transitory computer-readable storage medium of claim 18, further comprising program instructions stored in the non-transitory computer-readable storage medium that are executable to cause the computing system to:
- before determining that the origin data record created under a first account of a first party is to be mirrored to the second account of the second party, establish the connection between the first account of the first party and the second account of the second party.

* * * * *